United States Patent
Harper (10) Patent No.: US 12,481,995 B1
(45) Date of Patent: Nov. 25, 2025

(54) SECURE FINANCIAL TRANSACTION AND ELECTRONIC IDENTIFICATION SYSTEM

(71) Applicant: Marvin William Harper, Folcroft, PA (US)

(72) Inventor: Marvin William Harper, Folcroft, PA (US)

(*) Notice: Subject to any disclaimer, the term of this patent is extended or adjusted under 35 U.S.C. 154(b) by 127 days.

(21) Appl. No.: 18/407,764

(22) Filed: Jan. 9, 2024

(51) Int. Cl.
| | |
|---|---|
| G06K 15/00 | (2006.01) |
| G06F 21/32 | (2013.01) |
| G06Q 20/20 | (2012.01) |
| G06Q 20/32 | (2012.01) |
| G06Q 20/38 | (2012.01) |
| G06Q 20/40 | (2012.01) |

(52) U.S. Cl.
CPC ....... *G06Q 20/40145* (2013.01); *G06F 21/32* (2013.01); *G06Q 20/20* (2013.01); *G06Q 20/3278* (2013.01); *G06Q 20/386* (2020.05); *G06Q 20/405* (2013.01)

(58) Field of Classification Search
CPC ........ G06Q 20/12; G06Q 20/10; G06Q 20/40; G06Q 20/40145; G06Q 20/401; G06Q 20/3674; G06Q 20/3278; G06Q 20/20; G06Q 20/36; G06Q 20/4012; G06Q 20/326; G06Q 20/405; G06F 21/32
USPC ...................................................... 235/383
See application file for complete search history.

(56) References Cited

U.S. PATENT DOCUMENTS

| | | | |
|---|---|---|---|
| 8,322,606 | B2 | 12/2012 | Ong |
| D696,015 | S | 12/2013 | Daniel |
| 8,978,976 | B2 | 3/2015 | Seo |
| 9,111,082 | B2 | 8/2015 | Gangi |
| 10,158,631 | B2 | 12/2018 | Redpath |
| 11,909,860 | B1* | 2/2024 | So ............ G06Q 40/06 |
| 2008/0028230 | A1* | 1/2008 | Shatford ......... H04L 9/3231 |
| | | | 713/186 |
| 2013/0085918 | A1 | 4/2013 | Li |
| 2013/0190899 | A1* | 7/2013 | Slessman ........ G06F 9/5094 |
| | | | 700/28 |
| 2014/0012704 | A1* | 1/2014 | Mizhen ........ G06Q 30/04 |
| | | | 705/26.41 |

(Continued)

FOREIGN PATENT DOCUMENTS

WO 2020121063 6/2020

*Primary Examiner* — Daniel St Cyr (57) ABSTRACT

The secure financial transaction and electronic identification system is a security architecture. The secure financial transaction and electronic identification system is configured for use in a transaction. The secure financial transaction and electronic identification system provides interaction security protocols and identification validation protocols that: a) enable the completion of a transaction; while, b) maintaining the privacy of the parties to the transaction. The secure financial transaction and electronic identification system identifies that an authorized individual is using the secure financial transaction and electronic identification system. The secure financial transaction and electronic identification system securely stores information regarding one or more negotiable instruments accessible to the authorized individual. The secure financial transaction and electronic identification system securely transmits information regarding a selected negotiable instrument to a party who is participating in a transaction with the authorized individual.

12 Claims, 8 Drawing Sheets

(56) References Cited

U.S. PATENT DOCUMENTS

| | | | |
|---|---|---|---|
| 2018/0150846 A1* | 5/2018 | Maheshwari | G07G 1/009 |
| 2022/0051228 A1 | 2/2022 | Guo | |
| 2022/0294894 A1* | 9/2022 | Hefetz | G06Q 20/20 |

* cited by examiner

SECURE FINANCIAL TRANSACTION AND ELECTRONIC IDENTIFICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of user authentication involving the use of external additional devices. (G06F21/34)

SUMMARY OF INVENTION

The secure financial transaction and electronic identification system is a security architecture. The secure financial transaction and electronic identification system is configured for use in a transaction. The secure financial transaction and electronic identification system provides interaction security protocols and identification validation protocols that: a) enable the completion of a transaction; while, b) maintaining the privacy of the parties to the transaction. The secure financial transaction and electronic identification system identifies that an authorized individual is using the secure financial transaction and electronic identification system. The secure financial transaction and electronic identification system securely stores information regarding one or more negotiable instruments accessible to the authorized individual. The secure financial transaction and electronic identification system securely transmits information regarding a selected negotiable instrument to a party who is participating in a transaction with the authorized individual. The secure financial transaction and electronic identification system comprises a housing structure and a control circuit. The control circuit mounts in the housing structure.

These together with additional objects, features and advantages of the secure financial transaction and electronic identification system will be readily apparent to those of ordinary skill in the art upon reading the following detailed description of the presently preferred, but nonetheless illustrative, embodiments when taken in conjunction with the accompanying drawings.

In this respect, before explaining the current embodiments of the secure financial transaction and electronic identification system in detail, it is to be understood that the secure financial transaction and electronic identification system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the secure financial transaction and electronic identification system.

It is therefore important that the claims be regarded as including such equivalent construction insofar as they do not depart from the spirit and scope of the secure financial transaction and electronic identification system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
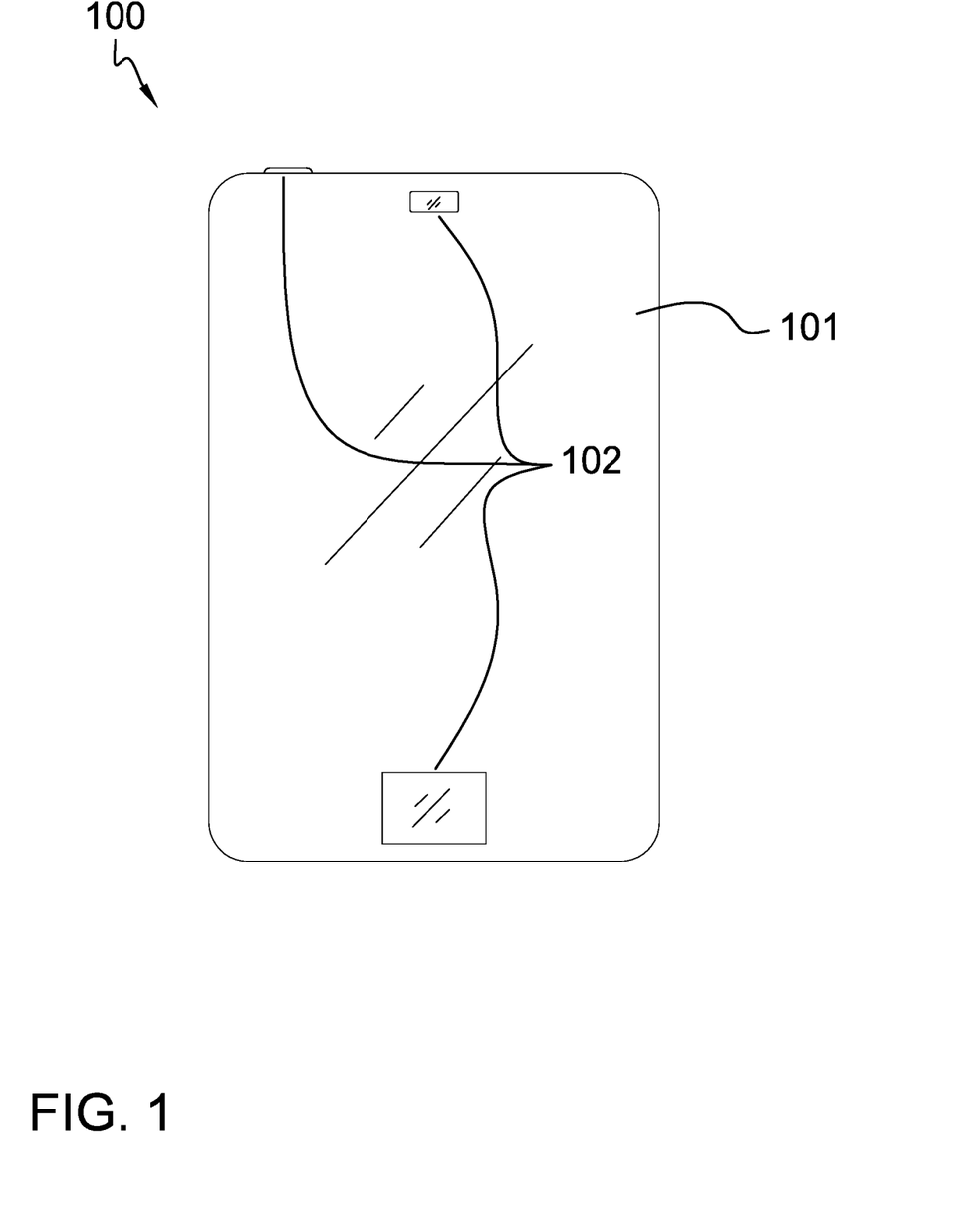
FIG. 1 is a front view of an embodiment of the disclosure.
Figure 2:
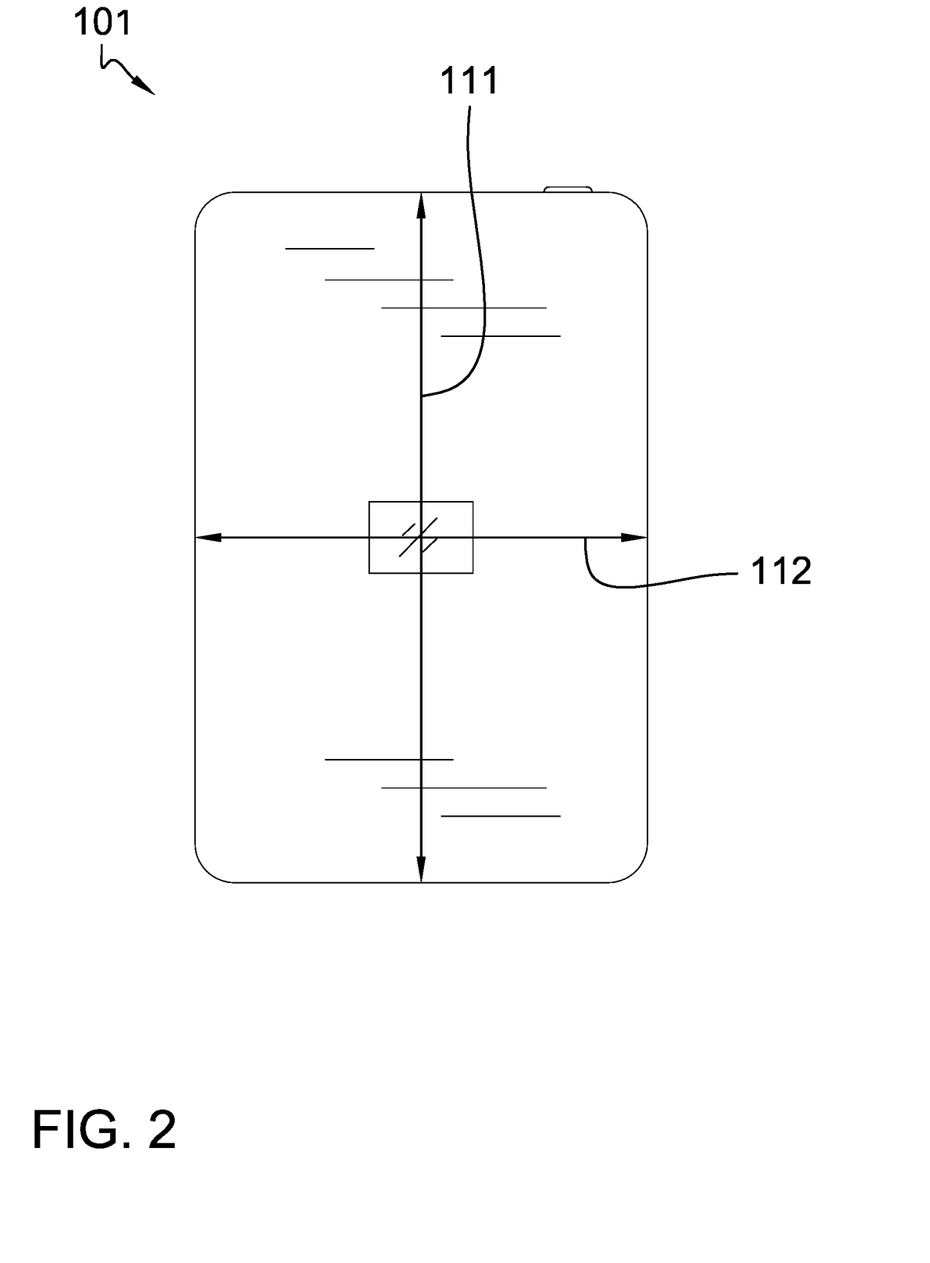
FIG. 2 is a rear view of an embodiment of the disclosure.
Figure 3:
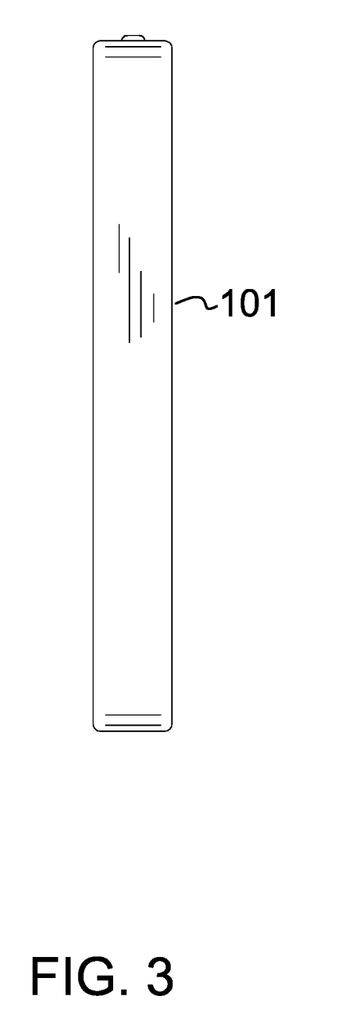
FIG. 3 is a side view of an embodiment of the disclosure.
Figure 4:
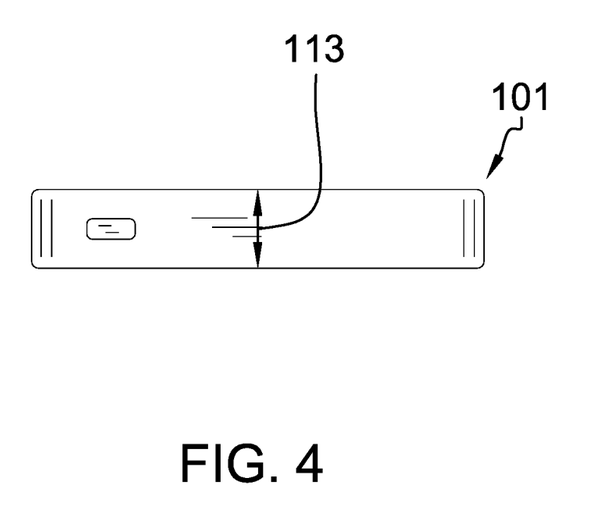
FIG. 4 is a top view of an embodiment of the disclosure.
Figure 5:
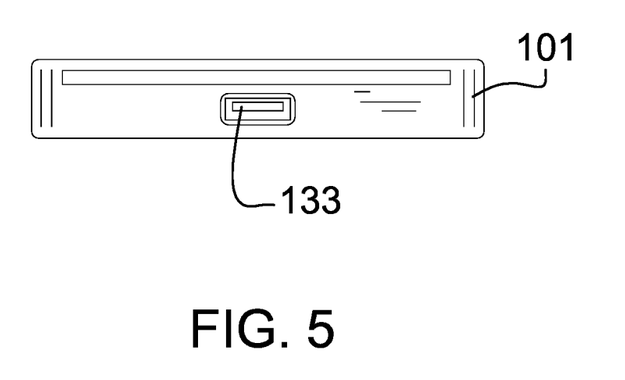
FIG. 5 is a bottom view of an embodiment of the disclosure.
Figure 6:
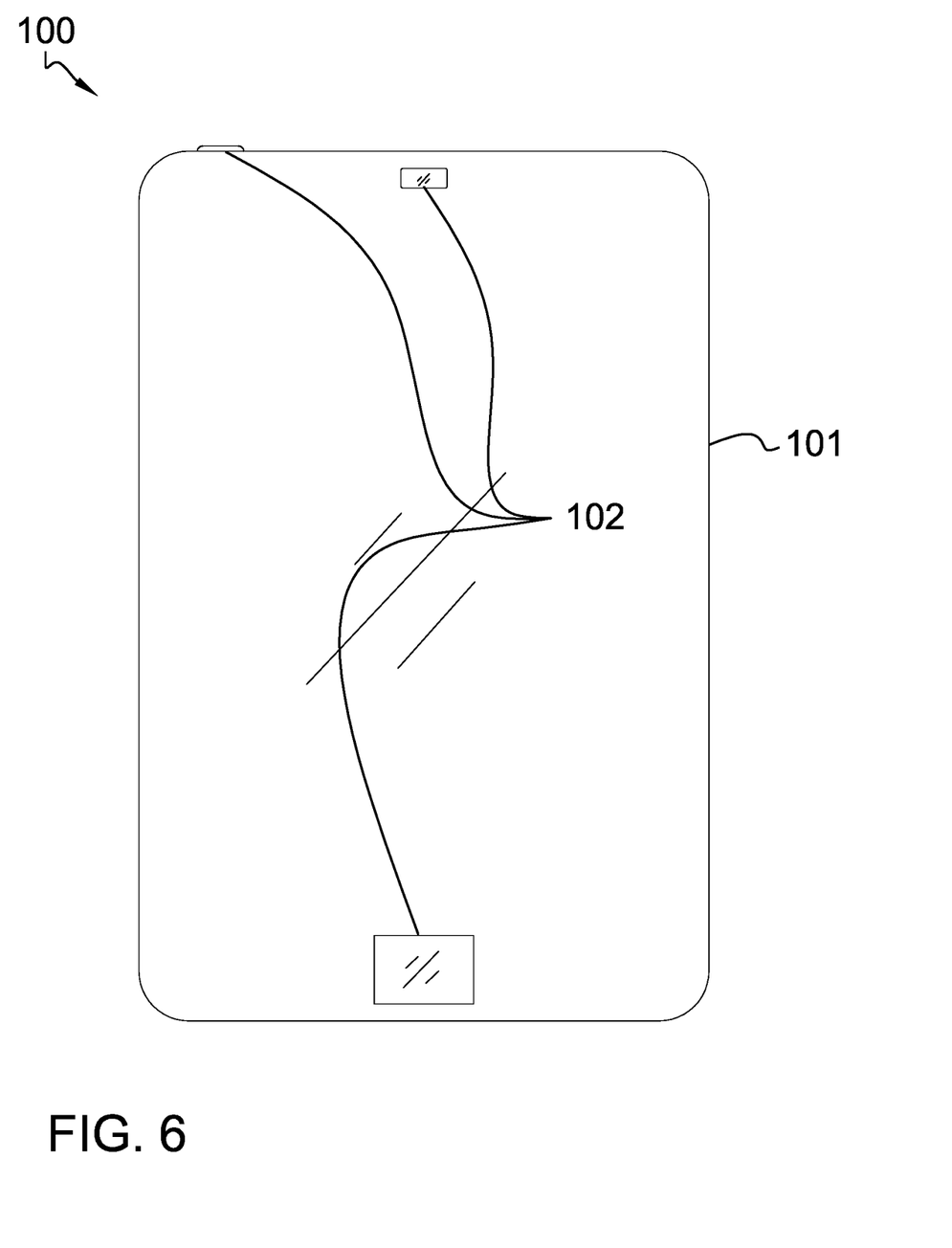
FIG. 6 is a front view of an alternate embodiment of the disclosure.
Figure 7:
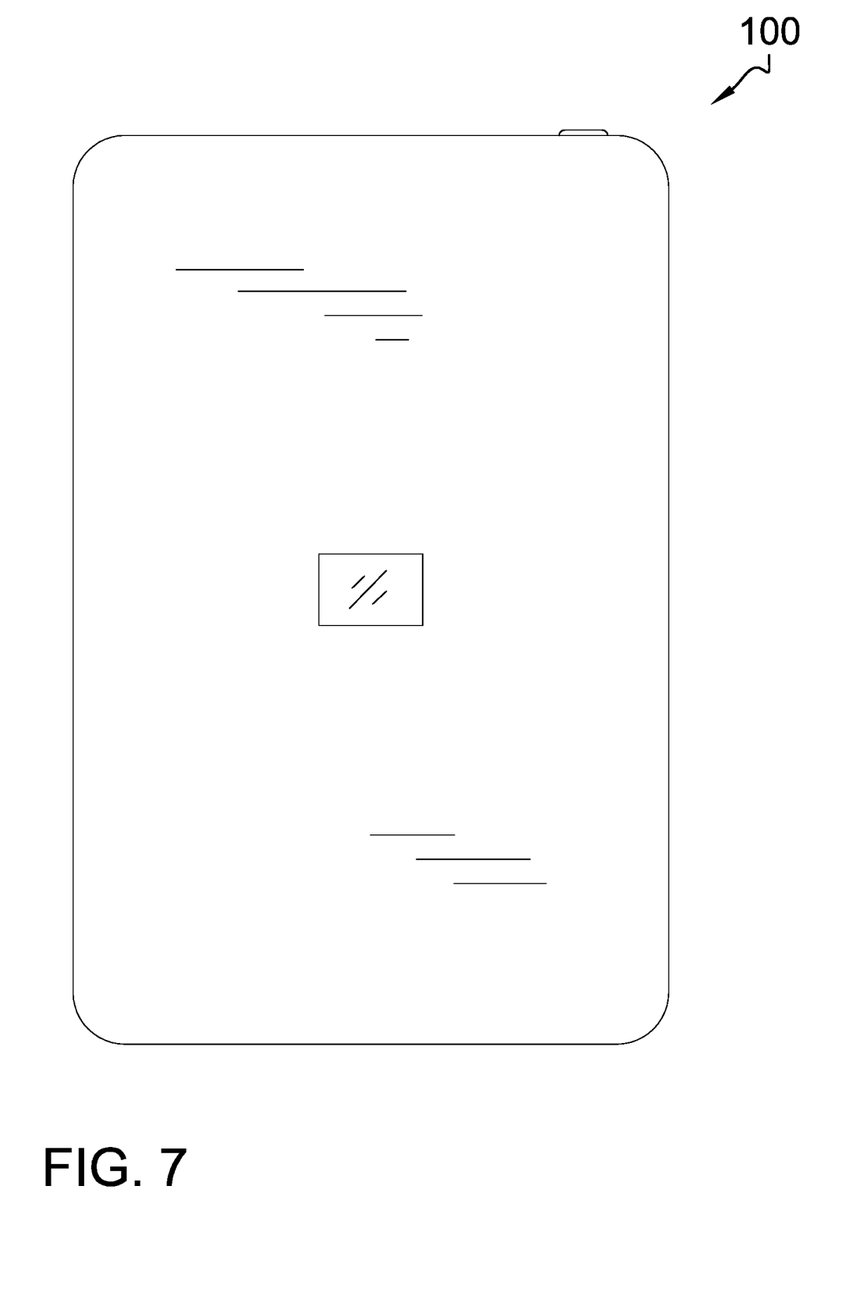
FIG. 7 is a rear view of an alternate embodiment of the disclosure.
Figure 8:
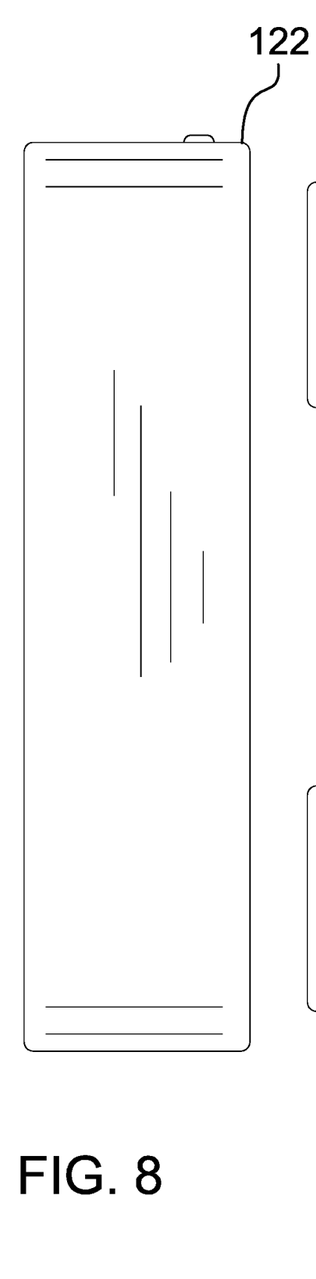
FIG. 8 is a side view of an alternate embodiment of the disclosure.
Figure 9:
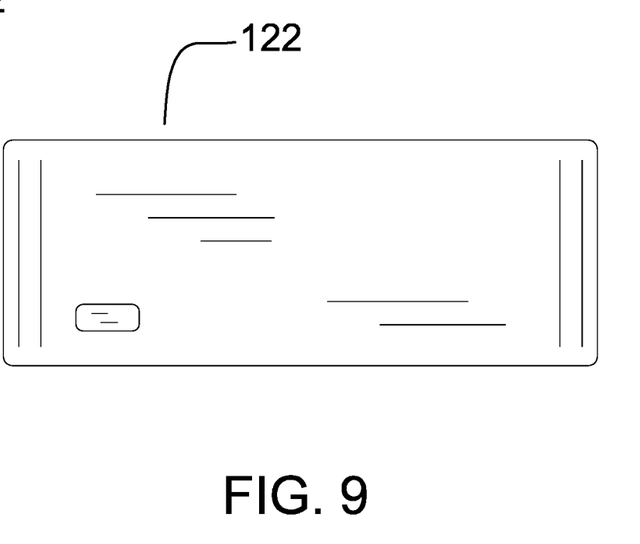
FIG. 9 is a top view of an alternate embodiment of the disclosure.
Figure 10:
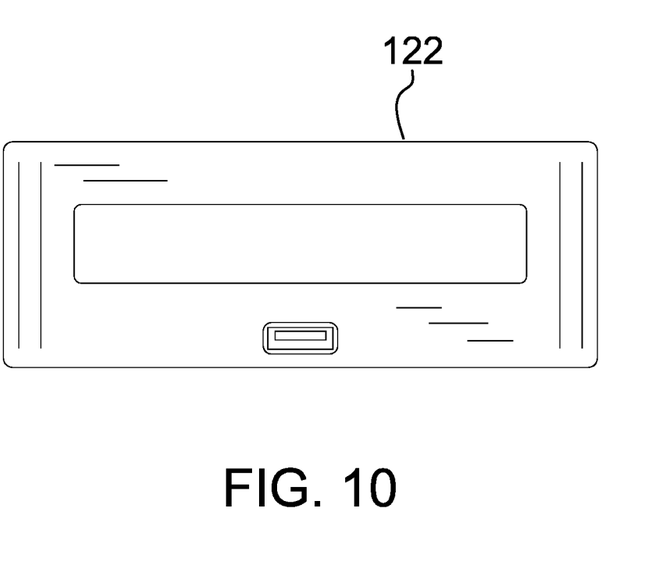
FIG. 10 is a bottom view of an alternate embodiment of the disclosure.
Figure 11:
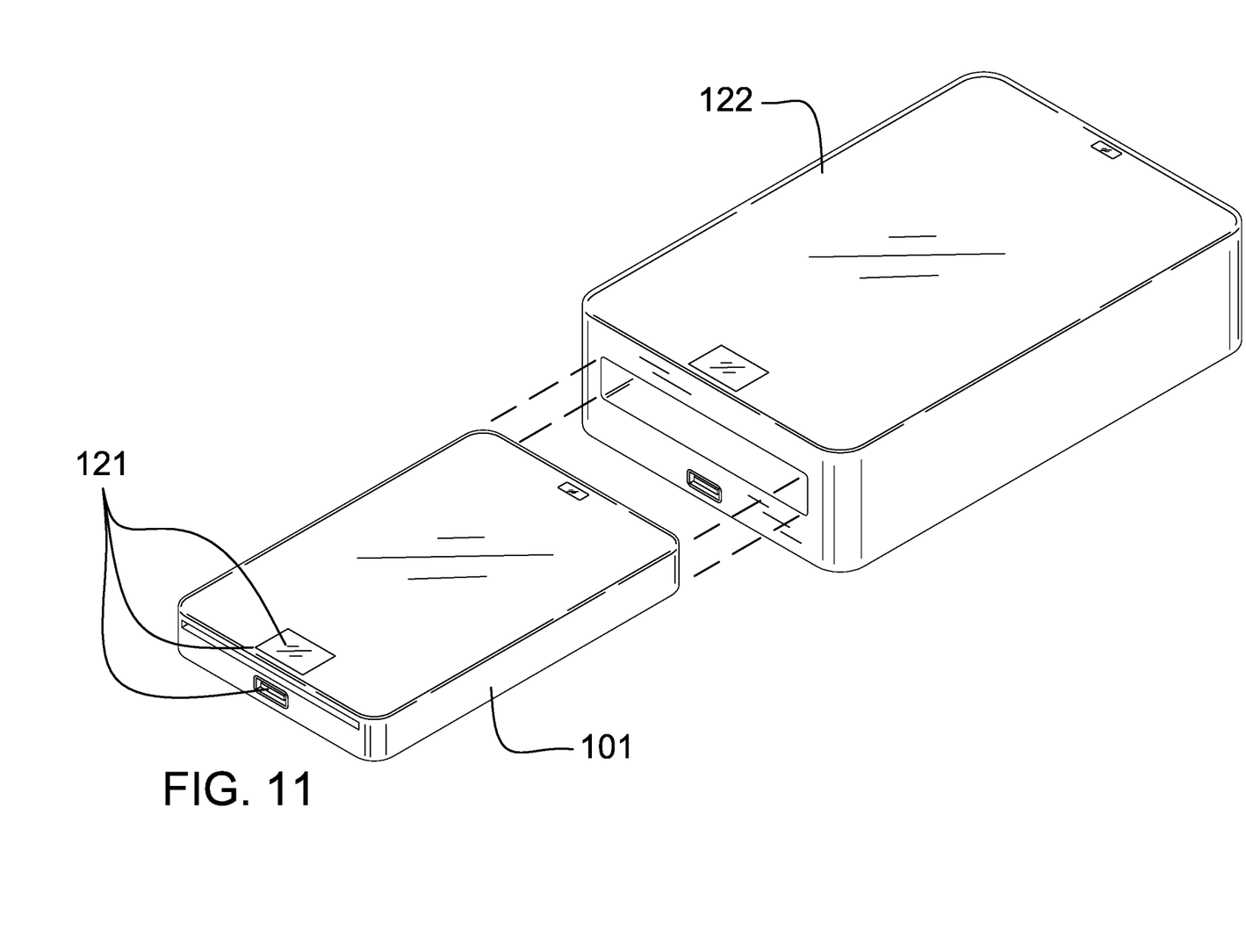
FIG. 11 is an in-use view of an embodiment of the disclosure.
Figure 12:
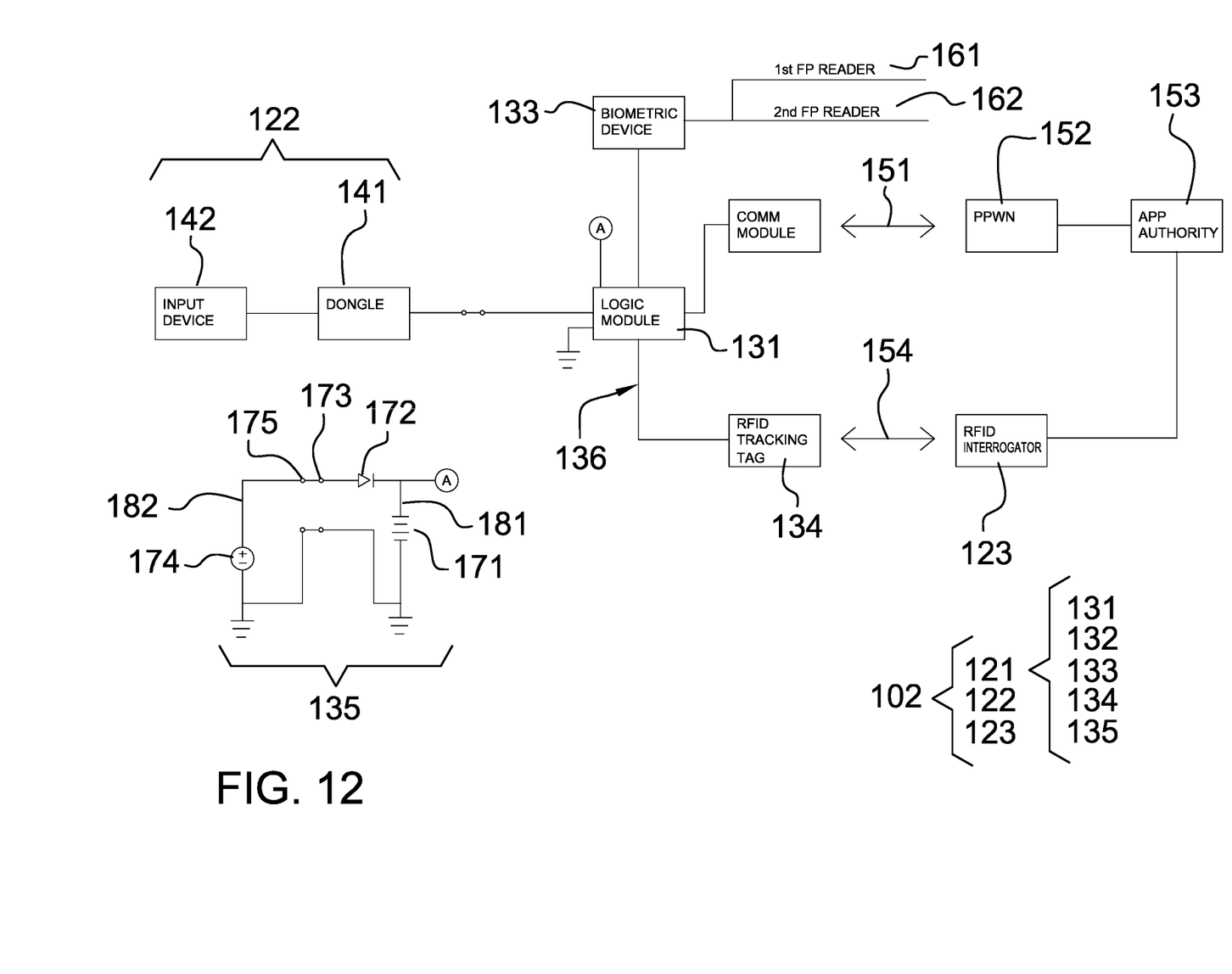
FIG. 12 is a schematic view of an embodiment of the disclosure.

Detailed reference will now be made to one or more potential embodiments of the disclosure, which are illustrated in FIGS. 1 through 12.

The secure financial transaction and electronic identification system 100 (hereinafter invention) is a security architecture. The invention 100 is configured for use in a transaction. The invention 100 provides interaction security protocols and identification validation protocols that: a)

enable the completion of a transaction; while, b) maintaining the privacy of the parties to the transaction. The invention 100 identifies that an authorized individual is using the invention 100. The invention 100 securely stores information regarding one or more negotiable instruments accessible to the authorized individual. The invention 100 securely transmits information regarding a selected negotiable instrument to a party who is participating in a transaction with the authorized individual. The invention 100 comprises a housing structure 101 and a control circuit 102. The control circuit 102 mounts in the housing structure 101.

The housing structure 101 forms a protective structure. The housing structure 101 is maintained in the custody of the authorized individual. The housing structure 101 contains the control circuit 102. The housing structure 101 is formed with all apertures and form factors necessary to allow the housing structure 101 to accommodate the use and operation of the control circuit 102. The housing structure 101 is a mechanical structure. The housing structure 101 forms a protected space that contains the control circuit 102.

The housing structure 101 is maintained in the custody of the authorized individual. The housing structure 101 is presented by the authorized individual to a participating party to verify the identity of the authorized individual. The housing structure 101 is presented by the authorized individual to the participating party to provide the participating party with information regarding a negotiable instrument that will be used by the participating party to complete a transaction.

The housing structure 101 comprises a major dimension 111, a minor dimension 112, and a center dimension 113. The major dimension 111 is the span of the length of the major axis of the physical structure of the housing structure 101. The span of the length of the major dimension 111 is roughly equal to the span of the length of the major axis of a credit card. The minor dimension 112 is the span of the length of the minor axis of the physical structure of the housing structure 101. The span of the length of the minor dimension 112 is roughly equal to the span of the length of the minor axis of a credit card. The span of the length of the center dimension 113 is greater than the span of the length of the center axis of a credit card.

The control circuit 102 is an electric circuit structure. The control circuit 102 collects information regarding the identification and the negotiable instruments of the authorized individual. The control circuit 102 stores the collected information within the housing structure 101. The control circuit 102 confirms the identity of the authorized individual and that the physical presence of the authorized individual is in the vicinity of the housing structure 101. The control circuit 102 transmits a messaging facility to an appropriate authority 153 that a transaction between the authorized individual and a participating party is about to occur. The control circuit 102 enables the release of information regarding the negotiable instrument that will be used to support the transaction. The control circuit 102 transmits the information regarding the negotiable instrument to an RFID interrogation circuit 123 that is in the custody of the participating party. The RFID interrogation circuit 123 confirms the validity of the received information regarding the negotiable instrument with the appropriate authority 153.

The control circuit 102 comprises a card circuit 121, an input circuit 122, and an RFID interrogation circuit 123. The input circuit 122 forms a detachable electric connection with the card circuit 121. The RFID interrogation circuit 123 communicates through an interrogation signal 154 with the card circuit 121.

The card circuit 121 is an electric subcircuit of the control circuit 102. The card circuit 121 performs the following functions of the control circuit 102: a) the card circuit 121 stores the collected information regarding the identity of the authorized individual and the negotiable instrument within the housing structure 101; b) the card circuit 121 confirms the identity of the authorized individual and that the physical presence of the authorized individual is in the vicinity of the housing structure 101; c) the card circuit 121 transmits a messaging facility to an appropriate authority 153 that a transaction between the authorized individual and a participating party is about to occur; d) the card circuit 121 enables the release of information regarding the negotiable instrument that will be used to support the transaction; and, e) the card circuit 121 transmits the information regarding the negotiable instrument to an RFID interrogation circuit 123 that is in the custody of the participating party.

The card circuit 121 comprises a logic module 131, a communication module 132, a biometric device 133, an RFID tracking tag 134, and a power circuit 135. The logic module 131, the communication module 132, the biometric device 133, the RFID tracking tag 134, and the power circuit 135 are electrically interconnected.

The logic module 131 is a readily and commercially available programmable electronic device that is used to manage, regulate, and operate the control circuit 102. The communication module 132 is a wireless electronic communication device that allows the logic module 131 to wirelessly communicate with an appropriate authority 153. The communication module 132 further comprises a wireless communication link 151, a PPWN 152 (commercially provided and publicly available cellular wireless network), and the appropriate authority 153. The communication module 132 forms the wireless communication link 151 with the PPWN 152. The PPWN 152 establishes a communication link with the appropriate authority 153. The communication module 132 exchanges one or more direct messaging facilities that are transmitted over the wireless communication link 151 to the appropriate authority 153. The message contained in the direct messaging facility informs the appropriate authority 153 that: a) the authorized individual is in possession of the invention 100; and, b) a valid transaction is about to be processed through the RFID interrogation circuit 123 of a point of sale terminal.

In the first potential embodiment of the disclosure, the communication module 132 communicates the direct messaging facilities as SMS and MMS messages between the logic module 131 and the appropriate authority 153 through the commercially provided and publicly available cellular wireless network 152. The use of a PPWN 152 is preferred because: a) of its low cost; b) of the widespread availability and the broad interoperability between competing commercially provided and publicly available cellular wireless networks; and, c) methods and techniques to send SMS and MMS messages over a PPWN 152 are well known and documented by those skilled in the electrical arts.

The logic module 131 further comprises an enabling signal 136. The logic module 131 transmits the enabling signal 136 to the RFID tracking tag 134. The enabling signal 136 is an electric signal. The enabling signal 136 is generated by the logic module 131. The logic module 131 transmits the enabling signal 136 to the RFID tracking tag 134. The enabling signal 136 controls the operation of the RFID tracking tag 134.

The biometric device 133 is an electric circuit. The biometric device 133 measures a distinct biological parameter of the authorized individual. The biometric device 133 uses the measured biological parameter to positively identify the authorized individual. The biometric device 133 transmits the information regarding the positive identification of the authorized individual to the logic module 131. The biometric device 133 further comprises a first fingerprint reader 161 and a second fingerprint reader 162.

The first fingerprint reader 161 is a commercially available security device. The first fingerprint reader 161 is a sensor that scans a fingerprint of the authorized individual and codes the scan into an electrical signal. The first fingerprint reader 161: a) stores a registered fingerprint of the authorized individual; b) scans a fingerprint during the process of authenticating the identity of the authorized individual; c) compares the scanned fingerprint to the registered fingerprint of the authorized individual; and, d) upon a fingerprint match sends a signal to the biometric device 133 verifying a fingerprint match that authenticates the identity of the authorized individual.

The second fingerprint reader 162 is a commercially available security device. The second fingerprint reader 162 is a sensor that scans a fingerprint of the authorized individual and codes the scan into an electrical signal. The second fingerprint reader 162: a) stores a registered fingerprint of the authorized individual; b) scans a fingerprint during the process of authenticating the identity of the authorized individual; c) compares the scanned fingerprint to the registered fingerprint of the authorized individual; and, d) upon a fingerprint match sends a signal to the biometric device 133 verifying a fingerprint match that authenticates the identity of the authorized individual.

The RFID tracking tag 134 is an electric circuit that works on a predetermined radio frequency. The RFID tracking tag 134 receives an interrogation signal 154 from the RFID interrogation circuit 123. The interrogation signal 154 is in the form of electromagnetic radiation on the predetermined radio frequency. The RFID tracking tag 134 encodes the information regarding the negotiable instrument into the interrogation signal 154. The RFID tracking tag 134 reflects the encoded interrogation signal 154 back to the RFID interrogation circuit 123. The RFID tracking tag 134 electrically connects to the logic module 131. The logic module 131 transmits the enabling signal 136 to the RFID tracking tag 134. The RFID tracking tag 134 will only receive and reflect the interrogation signal 154 when the RFID tracking tag 134 has been enabled by the enabling signal 136. The operation of the RFID tracking tag 134 is disabled when the logic module 131 discontinues the enabling signal 136.

The power circuit 135 is an electrical circuit. The power circuit 135 powers the operation of the control circuit 102. The power circuit 135 is an electrochemical device. The power circuit 135 converts chemical potential energy into the electrical energy required to power the control circuit 102. The power circuit 135 comprises a battery 171, a diode 172, a charging port 173, and an external power source 174. The external power source 174 further comprises a charging plug 175 and a second positive terminal 182. The battery 171 further comprises a first positive terminal 181. The battery 171, the diode 172, the charging port 173, the external power source 174, and the charging plug 175 are electrically interconnected.

The battery 171 is an electrochemical device. The battery 171 converts chemical potential energy into the electrical energy used to power the control circuit 102. The battery 171 is a commercially available rechargeable battery 171. The chemical energy stored within the rechargeable battery 171 is renewed and restored through use of the charging port 173. The charging port 173 is an electrical circuit that reverses the polarity of the rechargeable battery 171 and provides the energy necessary to reverse the chemical processes that the rechargeable battery 171 initially used to generate the electrical energy. This reversal of the chemical process creates a chemical potential energy that will later be used by the rechargeable battery 171 to generate electricity.

The charging port 173 forms an electrical connection to an external power source 174 using a charging plug 175. The charging plug 175 forms a detachable electrical connection with the charging port 173. The charging port 173 receives electrical energy from the external power source 174 through the charging plug 175. The diode 172 is an electrical device that allows current to flow in only one direction. The diode 172 installs between the rechargeable battery 171 and the charging port 173 such that electricity will not flow from the first positive terminal 181 of the rechargeable battery 171 into the second positive terminal 182 of the external power source 174. In the first potential embodiment of the disclosure, the external power source 174, the charging plug 175, and the charging port 173 are compatible with USB power requirements.

The input circuit 122 is an electric subcircuit of the control circuit 102. The input circuit 122 forms a detachable electric connection with the card circuit 121. The input circuit 122 collects information regarding the identification and the negotiable instruments of the authorized individual. The input circuit 122 transmits the collected information to the card circuit 121. The input circuit 122 is assumed to be maintained in a physically secure location. The input circuit 122 further comprises a dongle circuit 141 and an input device 142.

The dongle circuit 141 is an electric circuit. The dongle circuit 141 is dedicated to the card circuit 121 of the control circuit 102. The dongle circuit 141 by dedicated is meant that: a) the dongle circuit 141 is only interoperable with a specific card circuit 121; and, b) the dongle circuit 141 is able to identify its interoperable card circuit 121. The dongle circuit 11 receives information regarding the identification and the 12 negotiable instruments of the authorized individual from the input device 142. The dongle circuit 141 transmits the received information regarding the identification and the negotiable instruments of the authorized individual to the card circuit 121.

The input device 142 is an electric circuit. The input device 142 electrically connects to the dongle circuit 141. The input device 142 collects information regarding the identification and the negotiable instruments of the authorized individual from the authorized individual. The input device 142 transmits the collected information regarding the identification and the negotiable instruments of the authorized individual to the dongle circuit 141.

The RFID interrogation circuit 123 is an electric subcircuit of the control circuit 102. The input circuit 122 forms a communication link with the card circuit 121. The RFID interrogation circuit 123 is an RFID interrogator. The RFID interrogation circuit 123 interrogates the card circuit 121 to collect the appropriate information regarding the negotiable instrument and the identity of the authorized individual. The RFID interrogation circuit 123 confirms the validity of the received information regarding the negotiable instrument and the authorized individual with the appropriate authority 153.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Biometric Device: As used in this disclosure, a biometric device is a security device that identifies an individual through the use of a unique and measurable physiological characteristic of the individual. Typical unique and measurable physiological characteristic include, but are not limited to, fingerprints, DNA, or retina of the eye.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center, Major, Minor, and Thickness Dimensions: As used in this disclosure, the center dimension, the major dimension, the minor dimension, and the thickness each refer to the span of a length associated with a structure selected from the group consisting of a prism structure. The center dimension is the span of the length of the center axis of the selected structure. The major dimension is the span of the length of the major axis of the perimetrical boundary that contains the selected structure. The minor dimension is the span of the length of the minor axis of the perimetrical boundary that contains the selected structure. The terms center dimension, the major dimension, the minor dimension, and the thickness are also used to describe one or more linear axes of direction associated with the selected structure.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Commercially Provided and Publicly Available Cellular Wireless Network: As used in this disclosure, a commercially provided and publicly available cellular wireless network refers to subscription based publicly available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Credit Card: As used in this disclosure, a credit card is a form of identification that enables a person bearing the card to purchase a good or service from a vendor on the basis of credit provided by either the vendor or a third party. The form factor of a credit card is standardized with dimensions of roughly 3.4 inches by 2.1 inches.

Custody: As used in this disclosure, custody refers to an object or person that is under the physical control or care of a custodian. The custodian is an appropriate authority responsible for the proper operation, appropriate use, or well-being of the object or person that is in custody.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text. The image is interpretable by an individual viewing the projected image in a meaningful manner. A display device refers to an electrical device used to present these images.

Dongle: As used in this disclosure, a dongle is a second electrical circuit that plugs into a first electrical circuit. The first electrical circuit and the second electrical circuit are typically housed independently. The operation of the first electrical circuit is influenced by the connection of the second electrical circuit.

Email: As used in this disclosure, email describes a communication between a sender and one or more receivers that is delivered through a network wherein the nodes of the network comprise a plurality of logical devices. An email will generally comprise a text based communication component.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Exterior: As used in this disclosure, the exterior is used as a relational term that implies that an object is not contained within the boundary of a structure or a space.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Housing: As used in this disclosure, a housing is a rigid structure that encloses and protects one or more devices.

Identification Card: As used in this disclosure, an identification card is documentation that issued by an appropriate authority. The issued documentation is used by an individual to uniquely identify an individual during a transaction.

Identify and Identification: As used in this disclosure, the verb to identify refers to the establishment of: a) what an object is; or, b) who a person is. The verb to identify also refers to establishing: c) a relationship between two objects; d) a relationship between two people; or, e) a relationship between an object and a person. The term identification refers to both: f) the process of identifying an object or a person; and, g) an official method (generally in the form of documentation issued by an appropriate authority) used to uniquely establish the identity of the person or object.

Interior: As used in this disclosure, the interior is used as a relational term that implies that an object is contained within the boundary of a structure or a space.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Logical Device: As used in this disclosure, a logical device is a programmable electrical device that processes externally provided inputs to generate outputs that are determined from a previously programmed set of instructions.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure.

The major and minor axes intersect at the center of the structure. The major axis is always parallel or perpendicular to an edge of a rectangular or rectilinear structure.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Near Field Communication: As used in this disclosure, near field communication, commonly referred to as NFC, is an RFID technology and communication protocol that is commonly implemented on personal data devices. The operating range of near field technology is generally less than 20 centimeters.

Negative Space: As used in this disclosure, negative space is a method of defining an object through the use of open or empty space as the definition of the object itself, or, through the use of open or empty space to describe the boundaries of an object.

Negotiable Instruments: As used in this disclosure, negotiable instruments are objects used to facilitate financial transactions. In this disclosure, negotiable instruments are one or more items selected from the group consisting of: a) currency; and, b) credit cards.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

PDD: As used in this disclosure, PDD is an acronym for personal data device.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Personal Data Device: As used in this disclosure, a personal data device is a handheld logical device that is used for managing personal information and communication. Examples of personal data device include, but are not limited to, cellular phones, tablets, and smartphones.

Plug: As used in this disclosure, a plug is an electrical termination that electrically connects a first electrical circuit to a second electrical circuit or a source of electricity. As used in this disclosure, a plug will have two or three metal pins.

Point of Sale Terminal: As used in this disclosure, a point of sale terminal is an electrically operated device that is maintained by a retail sales establishment. The point of sale terminal calculates the financial obligations incurred within a sales transaction. When the point of sale terminal is used as a node on a network, the point of sale terminal can be further used to process the financial transaction through a banking network. A point of sale terminal is often abbreviated as a POS or POP (point of purchase) device.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publicly provided wireless network. The PPWN refers to a commercially provided and publicly available cellular wireless network.

Primary Difference: As used in this disclosure, a primary difference refers to a difference between two similar objects that is relevant to the creation of a patentable distinction between the two objects. The use of the term primary difference is intended to indicate that other differences that may exist between the two objects are not considered relevant to the creation of a patentable distinction within this disclosure.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Private: As used in this disclosure, the term private refers to the limitation of use of an object to one or more individuals. The term privacy refers to maintaining an object or individual in a location where the object or individual can be neither observed nor disturbed.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

RFID: As used in this disclosure, RFID refers to Radio Frequency Identification technology. RFID is a wireless technology that uses electromagnetic field to identify and retrieve data from tracking tags that are placed on or near an object.

RFID Interrogator: As used in this disclosure, an RFID interrogator is a device that transmits a radio signal at frequency designed to activate RFID tracking tags that are tuned to operate at that frequency; b) receives a modified reflected signal from each of the RFID tracking tags that were activated by the transmitted radio signal; c) decodes the information contained in the received modified reflected signal for each of the activated RFID tracking tag; and, d) forwards the decoded information to a designated device or process for subsequent processing.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Security Architecture: As used in this disclosure, a security architecture is a set of measures, often referred to as protocols, that are used to protect the physical integrity and privacy of an object. The object can be a physical object or data and information. A security architecture often comprises: a) physical integrity security protocols; b) interaction security protocols; c) identification validation protocols; and, d) the interface security protocols. The physical integrity security protocols generally involve the measures taken to limit the physical access to the object by an individual or organization. The interaction security protocols generally involve limiting the access to a transaction involving an individual or organization with a true interest in the transaction. By true interest is meant that the interest or organization has a financial or legal interest in the transaction or in the conclusion of the transaction. The identification validation protocols generally involve ensuring that the individual or organization participating in the execution of the transaction: a) are who they say they are; and, b) actually represent the assets and organizations they claim to represent. The interface security protocols ensure that: a) devices that are attempting to access the object are authorized to have access to (or interface) the object; and, b) are in the custody of an individual or organization with a true interest in the transaction this associated with the object.

Smart Card: As used in this disclosure, a smart card is a logical device. The smart card is a programmable electrical circuit housed in a plastic card that is roughly the size of a credit card. The smart card is commonly used to: a) identify an individual; b) store data associated with the individual; c) communicate with a point of sale terminal; and, d) facilitate financial transactions for the individual through the point of sale terminal. A smart card that communicates wirelessly with the point of sale terminal is referred to as a contactless smart card. The contactless smart card typically communicates using near field communication technology.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

Transaction: As used in this disclosure, a transaction refers to an exchange between two entities. The exchange refers to a transfer selected from the group consisting of a medium of exchange, a physical object, data, information, and knowledge.

In a legal environment, a transaction refers to exchanges between legally recognized entities such as individuals and incorporated organizations of individuals.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 12 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An secure financial transaction and electronic identification system comprising
a housing structure and a control circuit;
wherein the housing structure forms a protected space that contains the control circuit;
wherein the secure financial transaction and electronic identification system is a security architecture configured for use in a transaction;
wherein the secure financial transaction and electronic identification system provides interaction security protocols and identification validation protocols that: a) enable the completion of a transaction; while, b) maintaining the privacy of the parties to the transaction;
wherein the secure financial transaction and electronic identification system identifies that an authorized individual is using the secure financial transaction and electronic identification system;
wherein the secure financial transaction and electronic identification system securely stores information regarding one or more negotiable instruments accessible to the authorized individual;
wherein the secure financial transaction and electronic identification system securely transmits information regarding a selected negotiable instrument to a party who is participating in a transaction with the authorized individual;

wherein the housing structure forms a protective structure;
wherein the housing structure is maintained in the custody of the authorized individual;
wherein the housing structure contains the control circuit;
wherein the housing structure is formed with all apertures and form factors necessary to allow the housing structure to accommodate the use and operation of the control circuit;
wherein the housing structure is a mechanical structure;
wherein the housing structure comprises a major dimension, a minor dimension, and a center dimension;
wherein the major dimension is the span of the length of the major axis of the physical structure of the housing structure;
wherein the span of the length of the major dimension is roughly equal to the span of the length of the major axis of a credit card;
wherein the minor dimension is the span of the length of the minor axis of the physical structure of the housing structure;
wherein the span of the length of the minor dimension is roughly equal to the span of the length of the minor axis of a credit card;
wherein the span of the length of the center dimension is greater than the span of the length of the center axis of a credit card;
wherein the control circuit is an electric circuit structure;
wherein the control circuit collects information regarding the identification and the negotiable instruments of the authorized individual;
wherein the control circuit stores the collected information within the housing structure;
wherein the control circuit confirms the identity of the authorized individual and that the physical presence of the authorized individual is in the vicinity of the housing structure;
wherein the control circuit transmits a messaging facility to an appropriate authority that a transaction between the authorized individual and a participating party is about to occur;
wherein the control circuit enables the release of information regarding the negotiable instrument;
wherein the control circuit comprises a card circuit, an input circuit, and an RFID interrogation circuit;
wherein the input circuit forms a detachable electric connection with the card circuit;
wherein the RFID interrogation circuit communicates through an interrogation signal with the card circuit;
wherein the card circuit is an electric subcircuit of the control circuit;
wherein the card circuit performs the following functions of the control circuit:
  a) the card circuit stores the collected information regarding the identity of the authorized individual and the negotiable instrument within the housing structure; b) the card circuit confirms the identity of the authorized individual and that the physical presence of the authorized individual is in the vicinity of the housing structure; c) the card circuit transmits a messaging facility to an appropriate authority that a transaction between the authorized individual and a participating party is about to occur; d) the card circuit enables the release of information regarding the negotiable instrument that will be used to support the transaction; and, e) the card circuit transmits the information regarding the negotiable instrument to the RFID interrogation circuit.

2. The secure financial transaction and electronic identification system according to claim 1
wherein the input circuit is an electric subcircuit of the control circuit;
wherein the input circuit forms a detachable electric connection with the card circuit;
wherein the input circuit collects information regarding the identification and the negotiable instruments of the authorized individual;
wherein the input circuit transmits the collected information to the card circuit;
wherein the input circuit is assumed to be maintained in a physically secure location.

3. The secure financial transaction and electronic identification system according to claim 2
wherein the RFID interrogation circuit is an electric subcircuit of the control circuit;
wherein the input circuit forms a communication link with the card circuit;
wherein the RFID interrogation circuit is an RFID interrogator;
wherein the RFID interrogation circuit interrogates the card circuit to collect the appropriate information regarding the negotiable instrument and the identity of the authorized individual;
wherein the RFID interrogation circuit confirms the validity of the received information regarding the negotiable instrument and the authorized individual with the appropriate authority.

4. The secure financial transaction and electronic identification system according to claim 3
wherein the card circuit comprises a logic module, a communication module, a biometric device, an RFID tracking tag, and a power circuit;
wherein the logic module, the communication module, the biometric device, the RFID tracking tag, and the power circuit are electrically interconnected.

5. The secure financial transaction and electronic identification system according to claim 4
wherein the logic module is a programmable electronic device;
wherein the communication module further comprises a wireless communication link and a PPWN;
wherein the communication module forms the wireless communication link with the PPWN;
wherein the PPWN establishes a communication link with the appropriate authority;
wherein the communication module exchanges one or more direct messaging facilities with the appropriate authority;
wherein the message contained in the direct messaging facility informs the appropriate authority that: a) the authorized individual is in possession of the secure financial transaction and electronic identification system; and, b) a valid transaction is about to be processed through the RFID interrogation circuit of a point of sale terminal;
wherein the logic module further comprises an enabling signal;
wherein the logic module transmits the enabling signal to the RFID tracking tag;
wherein the enabling signal is an electric signal;
wherein the enabling signal is generated by the logic module;

wherein the logic module transmits the enabling signal to the RFID tracking tag;

wherein the enabling signal controls the operation of the RFID tracking tag.

6. The secure financial transaction and electronic identification system according to claim 5 wherein the biometric device is an electric circuit;

wherein the biometric device measures a distinct biological parameter of the authorized individual;

wherein the biometric device uses the measured biological parameter to positively identify the authorized individual;

wherein the biometric device transmits the information regarding the positive identification of the authorized individual to the logic module.

7. The secure financial transaction and electronic identification system according to claim 6 wherein the RFID tracking tag is an electric circuit that works on a predetermined radio frequency;

wherein the RFID tracking tag receives an interrogation signal from the RFID interrogation circuit;

wherein the interrogation signal is in the form of electromagnetic radiation on the predetermined radio frequency;

wherein the RFID tracking tag encodes the information regarding the negotiable instrument into the interrogation signal;

wherein the RFID tracking tag reflects the encoded interrogation signal back to the RFID interrogation circuit;

wherein the RFID tracking tag electrically connects to the logic module;

wherein the logic module transmits the enabling signal to the RFID tracking tag;

wherein the RFID tracking tag will only receive and reflect the interrogation signal when the RFID tracking tag has been enabled by the enabling signal.

8. The secure financial transaction and electronic identification system according to claim 7 wherein the power circuit is an electrical circuit;

wherein the power circuit powers the operation of the control circuit;

wherein the power circuit is an electrochemical device;

wherein the power circuit converts chemical potential energy into the electrical energy required to power the control circuit.

9. The secure financial transaction and electronic identification system according to claim 8 wherein the power circuit comprises a battery, a diode, a charging port, and an external power source;

wherein the external power source further comprises a charging plug and a second positive terminal;

wherein the battery further comprises a first positive terminal;

wherein the battery, the diode, the charging port, the external power source, and the charging plug are electrically interconnected.

10. The secure financial transaction and electronic identification system according to claim 9 wherein the biometric device further comprises a first fingerprint reader and a second fingerprint reader;

wherein the first fingerprint reader is a commercially available security device;

wherein the first fingerprint reader is a sensor that scans a fingerprint of the authorized individual and codes the scan into an electrical signal;

wherein the first fingerprint reader: a) stores a registered fingerprint of the authorized individual; b) scans a fingerprint during the process of authenticating the identity of the authorized individual; c) compares the scanned fingerprint to the registered fingerprint of the authorized individual; and, d) upon a fingerprint match sends a signal to the biometric device verifying a fingerprint match that authenticates the identity of the authorized individual;

wherein the second fingerprint reader is a commercially available security device;

wherein the second fingerprint reader is a sensor that scans a fingerprint of the authorized individual and codes the scan into an electrical signal;

wherein the second fingerprint reader: a) stores a registered fingerprint of the authorized individual; b) scans a fingerprint during the process of authenticating the identity of the authorized individual; c) compares the scanned fingerprint to the registered fingerprint of the authorized individual; and, d) upon a fingerprint match sends a signal to the biometric device verifying a fingerprint match that authenticates the identity of the authorized individual.

11. The secure financial transaction and electronic identification system according to claim 10 wherein the input circuit further comprises a dongle circuit and an input device;

wherein the dongle circuit is an electric circuit;

wherein the dongle circuit is dedicated to the card circuit of the control circuit;

wherein the dongle circuit by dedicated is meant that: a) the dongle circuit is only interoperable with a specific card circuit; and, b) the dongle circuit is able to identify its interoperable card circuit;

wherein the dongle circuit receives information regarding the identification and the negotiable instruments of the authorized individual from the input device;

wherein the dongle circuit transmits the received information regarding the identification and the negotiable instruments of the authorized individual to the card circuit;

wherein the input device is an electric circuit;

wherein the input device electrically connects to the dongle circuit;

wherein the input device collects information regarding the identification and the negotiable instruments of the authorized individual from the authorized individual;

wherein the input device transmits the collected information regarding the identification and the negotiable instruments of the authorized individual to the dongle circuit.

12. The secure financial transaction and electronic identification system according to claim 11 wherein the battery is an electrochemical device;

wherein the battery is a rechargeable battery;

wherein the charging port is an electrical circuit that reverses the polarity of the rechargeable battery;

wherein the charging port forms an electrical connection to an external power source using a charging plug;

wherein the charging plug forms a detachable electrical connection with the charging port;

wherein the charging port receives electrical energy from the external power source through the charging plug;

wherein the diode is an electrical device that allows current to flow in only one direction;

wherein the diode installs between the rechargeable battery and the charging port such that electricity will not flow from the first positive terminal of the rechargeable battery into the second positive terminal of the external power source.

* * * * *